Nov. 15, 1966       G. C. ELTENTON       3,285,416
ROTARY SEPARATION OF VISCOUS PSEUDO-PLASTICS
Filed May 23, 1963
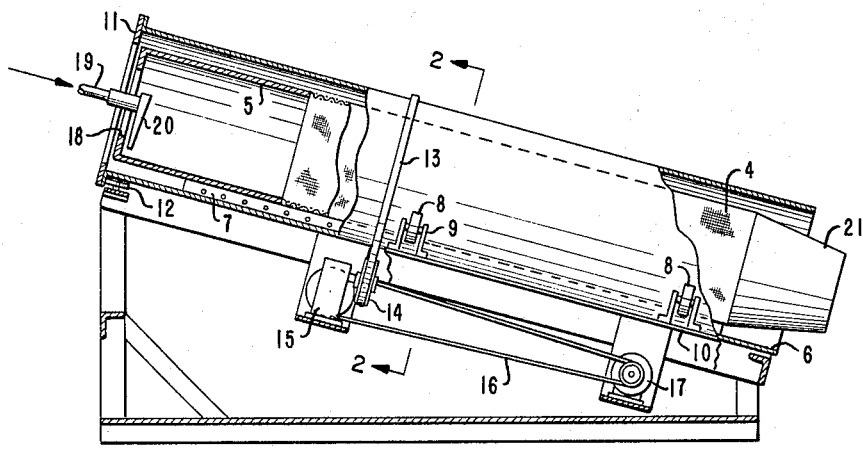
FIG. 1
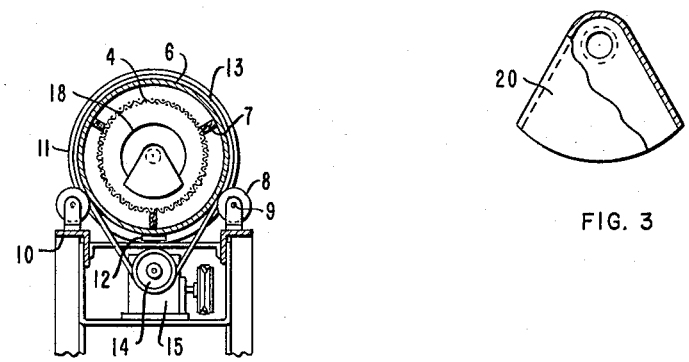
FIG. 2
FIG. 3
INVENTOR:
GEORGE C. ELTENTON
BY: Oswald H. Milmore
HIS ATTORNEY

United States Patent Office 3,285,416
Patented Nov. 15, 1966

3,285,416
ROTARY SEPARATION OF VISCOUS PSEUDO-PLASTICS
George C. Eltenton, Spital, Wirral, England, assignor to Shell Oil Company, New York, N.Y., a corporation of Delaware
Filed May 23, 1963, Ser. No. 282,737
Claims priority, application Great Britain, May 30, 1962, 20,840/62
5 Claims. (Cl. 210—77)

The invention relates to a method of separating liquid phases, and is more particularly concerned with the separation of pseudo-plastics from another liquid. The term "pseudo-plastics" is used herein to denote materials having non-Newtonian viscosity characteristics, i.e., wherein the shear rate is not proportional to the shear stress. The invention is especially applicable to gels wherein the shear stress decreases with sheat rate, among which are included Bingham liquids.

Hitherto it has been difficult to effect a physical separation of a mixture of liquid phases wherein the specific gravity difference is small. Such difficulty is severe when one of the phases is so viscous that it is likely to clog a centrifuge.

It is an object of this invention to provide an improved method suitable for separating such liquid phases provided that one of the liquids is a pseudo-plastic.

According to the invention the mixture of liquid phases is separated in a container, such as a drum, having a wall with small perforations and the surface characteristics that the pseudo-plastic wets the wall less than the other (Newtonian) liquid, the drum being rotated slowly about an axis which is inclined to the horizontal. The initial mixture is supplied to the upper end of the container, the said other liquid flows through the perforations, and the pseudo-plastic forms a cohesive, sausage-like mass which occupies the interior of the container and is discharged therefrom at the lower end.

The rotating container preferably contains throughout at least 30% of its circumferential wall area perforations between 0.0001 and 0.0025 sq. in. in area, said wall being non-angular and either entirely concave or including concave and flat portions, and the axis of rotation is between 5° and 60° to the horizontal, although angles below 30°, e.g., 10°–15°, are preferred. An inlet for the mixture of liquid phases and an outlet opening for the concentrated pseudo-plastic are provided at the upper and lower ends, respectively, the said outlet opening spaced from the inlet by a distance at least the average radial dimension of circumferential wall of the container, preferably several times, viz., at least five times the said dimension.

To facilitate the collection of the Newtonian liquid, which flows through the small perforations, an outer, circumferential wall spaced radially from the rotatable container is preferably provided.

The preferred shape of the rotatable, perforated container is that of a cylinder, but containers which are slightly elliptical or otherwise nearly circular in cross section can also be used.

Although any inlet device may be used, it is desirable to arrange it to cause the mixture of liquids entering the rotatable container to pass through a distributor chute or "calmer," whereby strong currents are prevented. This may take the form of a fan-shaped chute extending perpendicularly to and fixed to a stationary supply pipe which extends through the upper transverse wall of the container.

The outlet opening in the lower region of the container is large and preferably transverse to the axis of rotation; especially suitable are containers which have open lower ends, but a slightly converging or even flaring discharge nose or cone may be attached to the open end, as will appear in the drawings. The outlet should avoid obstructions, which present weirs to the discharge of the pseudo-plastic and be at least as large as the cross-section of the concentrated mass of pseudo-plastic discharged.

The invention will be described in detail with reference to the accompanying drawings forming a part of this specification and showing one illustrative embodiment, wherein:

FIGURE 1 is a side elevation of the separator, parts appearing in section;

FIGURE 2 is a transverse section taken on the line 2—2 of FIGURE 1; and

FIGURE 3 is an elevation view of the inlet distributor, parts appearing in section.

Referring to the drawing in detail, the separator comprises a rotatable separator cylinder including a gauze part 4 and an imperforate part 5, mounted in spaced and fixed relation to an outer, imperforate, cylindrical collector wall 6 by perforated, longitudinal spacers 7. The assembly of separator cylinder and collector is mounted for rotation about an inclined axis by idler rollers 8 having journal pins 9 carried by a frame 10. The collector has an annular plate 11 which projects radially to form a rim which engages an idler roller 12 mounted on a journal pin fixed to the said frame, to prevent axial displacement of the collector. The rotatable parts are driven by a belt 13 which extends around the collector 6 and a drive pulley 14 which is driven through a gear-reduction unit 15 by a belt 16 from a motor 17. The motor and/or gear box may be of the type which permits operation of the separator cylinder at an adjustable speed.

The speed of rotation depends upon a number of variables, such as the difficulty of separation of the phases and the volume ratio of the phases in the feed mixture, and is further influenced by the slope of the container, and can be determined readily by empirical methods for any specific system. As an indication of suitable speeds, it can be stated that for a separator as shown in the drawings, when the feed mixture contains a pseudo-plastic and a Newtonian liquid in the volumetric ratio of one to two, and for separator cylinder diameters of from 6.5 to 20 inches, the speed is usually between the limits given by the formula:

$$N = K\left(\frac{30}{D} - 1\right)$$

where

N is the speed in rev. per min.,
D is the diameter in inches and
K is a proportionality constant, having a value between 8 and 30.

By way of example, the total length of a separator container may be between 6 ft. and 9 ft., and its diameter between 0.8 ft. and 1.5 ft.

The relative axial extents of the imperforate part 5 and the perforate part 4 may also be varied. It is usually desirable that at least one-fifth, up to one-half, of the total length of the separator cylinder (at the raised, inlet end) be imperforate, and imperforate sections extending through between about 30 and 40% of the length are often preferred and it is preferred that at least 50% of the wall be perforated. The purpose of providing the imperforated part at the inlet end is to prevent the loss of the pseudo-plastic through the perforations before concentration thereof in the sausage-like mass to be described. The required or optimum length of the imperforate part can, therefore, be selected for any specific situation by making it as short as possible, consistent with avoiding excessive drainage of the pseudo-plastic through the openings. Although in the illustrated embodiment the gauze part 4 extends only to the part 5, it is evident that the entire cylinder may be formed of gauze and the inlet end thereof can be made imperforate by placing the part 5 within it.

Suitable perforations through the part 4 are preferably those between 0.0002 and 0.0015 sq. in. in area, and the perforations advantageously are of uniform size. The number of perforations is preferably between 100 and 1500, e.g., about 900, per sq. in.

A particularly suitable form of wall for the separator cylinder wall 4 is a wire gauze, having a mesh size of between 10 and 50.

The separator cylinder has a transverse end closure wall 18 having a central opening through which extends a supply pipe 19. Fixed to the inlet pipe is a downwardly flared, transverse distributor or chute 20 having an arcuate lower outlet near to but spaced from the imperforate wall 5. The outlet end of the separator cylinder is open but may have attached thereto an imperforate, convergently tapered discharge cone or tube 21, which is formed with a smooth inner surface, to avoid any weir-like obstruction, and of size sufficiently for the discharge of the mass of concentrated pseudo-plastic by gravity.

In operation, the mixture of liquid phases is admitted through the pipe 19 and chute 20 while the container 4, 5 is rotated, and rolls gently within the wall of the container. The pseudo-plastic becomes concentrated and rolls itself up in the form of sausage-like mass which is discharged through the frusto-conical tube 21. The diameter of this mass is typically from one-fifteenth to one-quarter of the diameter of the container, but may fall outside of these limits depending upon the ratio of the liquids, their nature and the operating conditions. The speed of rotation is not greater than that at which the pseudo-plastic is lifted above the lower half of the container. Thus, the said mass should remain within the space below the inclined plane through the central axis having a horizontal trace as viewed in FIG. 2. The Newtonian liquid drains out through the perforations of the part 4 into the collector 6, from which it flows out of the lower end into a receiver, not shown.

The mixture of liquid phases is preferably fed into the container at a rate between one and four times the volume of the container per hour. The separation is preferably carried out without applying a pressure differential.

If desired, when the Newtonian liquid which passes through the perforations in the gauze contains significant quantities of the pesudo-plastic, it may be subjected to a second separation in a like separator according to the invention.

Regarding the physical characteristics of the pseudo-plastics which can be effectively separated by this invention, it may be stated that all have a definite coherence. It is often a gel which is less solid than worked putty and approaches the consistency and surface tension of the white of an underdone egg; its density may be close to, slightly more or slightly less than that of the Newtonian liquid—usually water—associated with it. When the physical characteristics of the gel were such that it lacks coherence and could be described as granular, with the particles having diameters from 1 to 5 mm. in diameter, poor separations were attained.

The separation of this invention is useful, for example, in the separation of a mixture consisting of an alkyl benzene from water.

*Example*

A feed mixture contained water and a gel in volumetric ratio of 1:2. The gel contained 60–65% by weight of active matter, consisting of a mixture of sodium alkyl benzene sulphonates, wherein the alkyl chain contained from 8 through 13 carbon atoms, together with water. An aqueous phase was separated from the said mixture using the apparatus described above. The gauze was wetted by water more readily then by the gel.

The separator container was 7 ft. long, 18 inches in diameter, and a perforated part formed of gauze with 900 square openings per sq. in. of area, and was rotated slowly at between 20 and 30 rev. per min. about an axis inclined 15° to the horizontal. The rate of feed was between 100 and 200 gallons per hour.

The aqueous phase passed through the gauze while the gel formed a large sausage-shaped mass, which passed out through the cone 21. The separation was found to be very good, that is, the active matter content of the concentrated mass discharged through the zone was above 60% by weight while the active matter content of the aqueous phase was less than 0.1% by weight. Moreover, the inorganic salt content of the concentrated gel was less than 0.1%, which is quite remarkable.

I claim as my invention:

1. A process for separating a mixture of liquid phases within a separator container having a multitude of small perforations each between 0.0001 and 0.0025 square inch in area, one of said phases being a pseudo-plastic adapted to form a cohesive mass and wetting the surface of said container less than another liquid phase of the mixture, the other liquid phase being a Newtonian liquid, comprising the steps of:

(a) slowly rotating said container about an axis inclined at between 5° and 60° to the horizontal,
   (b) admitting said mixture to the upper end of said container,
   (c) rotating said container about said axis at relatively slow speeds so that the major part of said pseudo-plastic forms a concentrated cohesive mass within the container while discharging the other liquid through said small perforations, and
   (d) discharging said concentrated cohesive mass from the container at a lower part thereof.

2. Process as defined in claim 1 wherein said pseudo-plastic is of the type wherein the viscosity decreases with increasing shear.

3. Process as defined in claim 2 wherein the volume ratio of the pseudo-plastic phase to the Newtonian liquid phase is between about 1:1 and 1:3, and the container is a cylinder of diameter between about 6 and 20 inches and a length at least as great as five times the average radius thereof, and the container is rotated at a rate defined by $$N = K\left(\frac{30}{D} - 1\right)$$

wherein N is in revolutions per minute, D is the container diameter in inches and K has a value between about 8 and 30.

4. Method as defined in claim 1 wherein said speed of rotation is controlled to maintain said liquid phases within the lower half of the separator container.

5. Process as defined in claim 1 wherein said mixture consists essentially of a gel of an alkyl benzene sulphonate and water.

References Cited by the Examiner

UNITED STATES PATENTS

| | | | |
|---|---|---|---|
| 2,321,243 | 6/1943 | Range | 210—403 |
| 2,664,204 | 12/1953 | Hurter | 210—403 |
| 2,750,855 | 6/1956 | Lathrop | 210—403 X |
| 2,844,253 | 7/1958 | Everett | 210—77 X |
| 2,995,484 | 8/1961 | Cox | 210—403 X |

REUBEN FRIEDMAN, *Primary Examiner.*

SAMIH ZAHARNA, *Examiner.*